United States Patent [19]

Coll et al.

[11] Patent Number: 4,709,980
[45] Date of Patent: Dec. 1, 1987

[54] BURIED-CABLE JUNCTION ENCLOSURE WITH CABLE-STORAGE VAULT

[75] Inventors: Gene P. Coll, Cranford; Ignazio Leonardo, Mountainside, both of N.J.

[73] Assignee: Coastal Engineered Products Company, Inc., Varnville, S.C.

[21] Appl. No.: 761,792

[22] Filed: Aug. 2, 1985

[51] Int. Cl.⁴ .............................................. G02B 6/24
[52] U.S. Cl. .................................... 350/96.20; 174/37
[58] Field of Search ............... 350/96.20, 96.21, 96.22, 350/96.23; 174/37

[56] References Cited

U.S. PATENT DOCUMENTS 3,878,314  4/1985  Link ........................................ 174/37

FOREIGN PATENT DOCUMENTS 3405309  8/1985  Fed. Rep. of Germany ... 350/96.22
2573544  5/1986  France ............................... 350/96.21
0117513  7/1983  Japan ................................... 350/96.2

Primary Examiner—Eugene R. Laroche
Assistant Examiner—James C. Lee
Attorney, Agent, or Firm—Hopgood, Calimafde, Kalil, Blaustein & Judlowe

[57] ABSTRACT

The invention contemplates a buried-cable junction enclosure that is characterized by an inner wall surface of circular symmetry about a vertical axis, wherein a relatively large-diameter cylindrical base member or storage vault accommodates substantial helically coiled end lengths of the two cables to be spliced, and wherein an intermediate frustoconical member provides smooth inner-surface transition from the base member to the much-reduced cylindrical inner surface of a pedestal member, having removable-cap access at or near grade level. The pedestal member is sized and adapted for removable suspension and containment of the splice case by which corresponding lines (fibers) of the respective cable ends are connected. The respective cables enter the enclosure at diametrically opposed ports at the closed end or floor of the base member.

15 Claims, 4 Drawing Figures

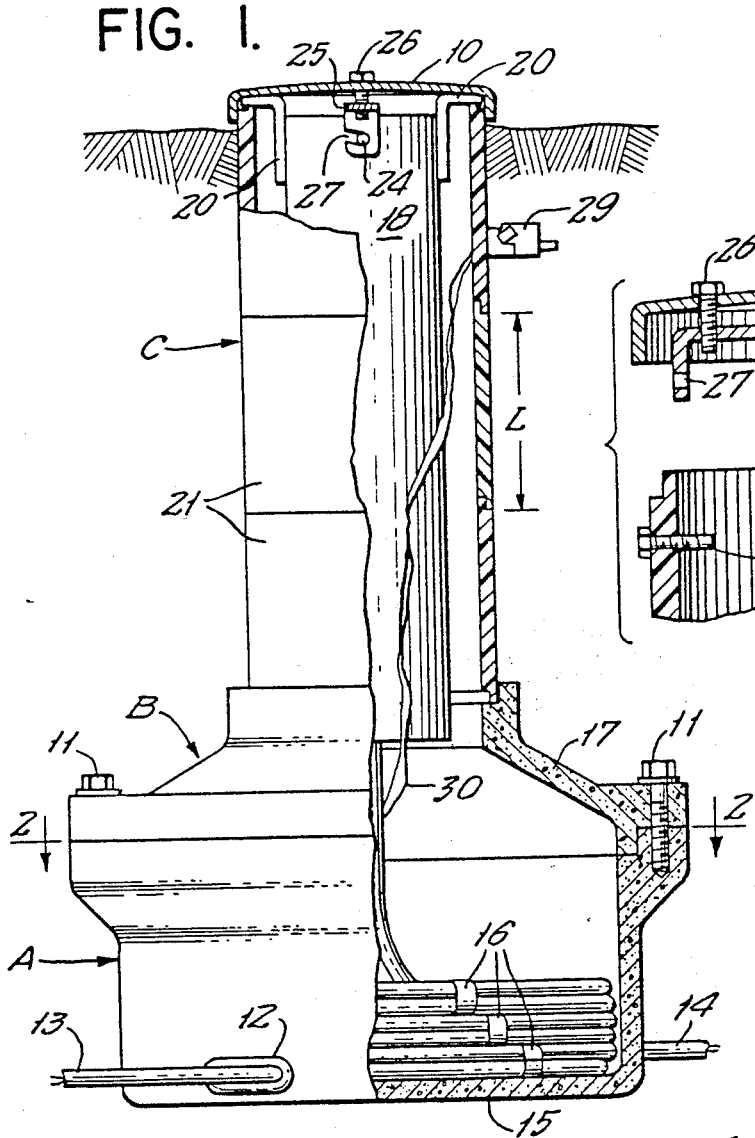
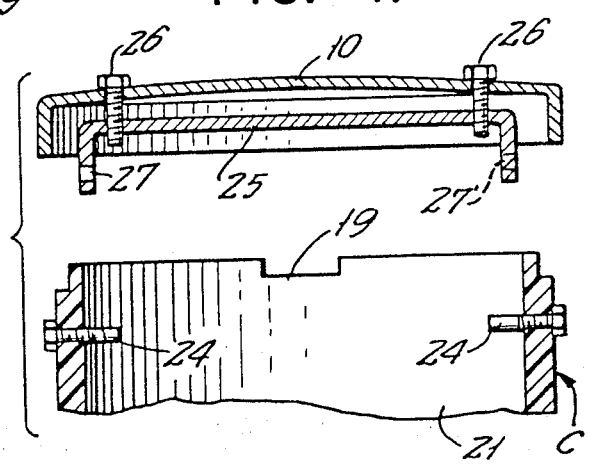
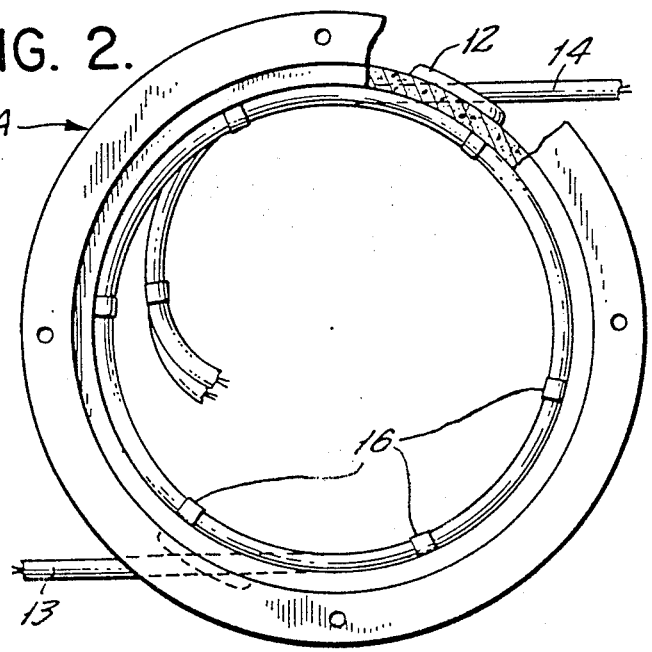

BURIED-CABLE JUNCTION ENCLOSURE WITH CABLE-STORAGE VAULT

BACKGROUND OF THE INVENTION

The invention relates to a cable-junction enclosure of the type adapted for burial to accommodate spliced ends of buried cables having buried entry to the enclosure.

As optical-fiber communication cable comes into increasing use, it is becoming increasingly apparent that prior techniques of accommodating multiple-line cable splices are simply inadequate to the accommodation of optical-fiber cable junctions. The fibers are brittle, and any kink involving less than the cable-manufacturer's specification for minimum-bend radius will render the cable unfit for use. Typically, buried multiple-line optical-fiber cable will contain 4 to 12 single-mode independent fibers; the cable may or may not be armored, for electrical gounding and/or for protection against rodents, and cable diameter is in the ½" to ⅝" range. For such cable, the manufacturer may specify a minimum radius of curl, such as not to exceed 10 inches.

Additional to consideration for minimum radius of curl, it is desirable to provide flexibility in the mounting of the splice case by which corresponding lines (fibers) of the respective cable ends are connected and rendered accessible for servicing, preferably at a nearby maintenance vehicle.

BRIEF STATEMENT OF THE INVENTION

It is an object of the invention to provide an improved cable-junction enclosure having the capacity for removable access to the contents of the splice case by which two buried cables are connected.

Another object is to meet the above object with a construction which features ease of installation and accessibility to the splice case and its contents.

A specific object is to meet the above objects with a structural configuration which is inherently suited to assure (a) non-kinking removal of cable stored in the enclosure (as when the splice case must be removed for inspection, testing, maintenance, or repair), and (b) non-kinking return of cable into safely stored containment when the splice case is returned to the enclosure.

The invention achieves these objects in an upstanding enclosure having an inner wall surface of circular symmetry about a vertical axis, wherein a relatively large-diameter cylindrical base member or storage vault accommodates substantial helically coiled end lengths of the two cables to be spliced, and wherein an intermediate frustoconical member provides smooth inner-surface transition from the base member to the much-reduced cylindrical inner surface of a pedestal member, having removable-cap access at or near grade level. The pedestal member is sized and adapted for removable suspension and containment of the splice case by which corresponding lines (fibers) of the respective cable ends are connected. The respective cables enter the enclosure at diametrically opposed ports at the closed end or floor of the base member, and the coiled storage of both cable-end lengths is facilitated by spaced taping or other means of retaining the cable-end lengths as effectively a unit-handling pair. The cylindrical diameter of the inner surface of the base member is at least equal to and preferably slightly greater than twice the specified minimum radius of curl for the involved cable, and the diameter of the pedestal member need be only as dictated by splice-case accommodation, being characterized by much smaller radius than the minimum radius of curl for the cable.

DETAILED DESCRIPTION

The invention will be illustratively described in detail for a preferred embodiment, in conjunction with the accompanying drawings, in which:

FIG. 1 is a view in elevation of a cable-junction enclosure, partly broken away to reveal vertical-section detail;

FIG. 2 is a partly broken-away plan view of the base member of the enclosure of FIG. 1, as viewed at 2—2 in FIG. 1;

FIG. 3 is an enlarged fragmentary view in perspective of the uncapped upper end of the enclosure; and FIG. 4 is an exploded fragmentary view in vertical section, on an enlarged scale, to illustrate mechanism for removably securing the cover of the enclosure of FIG. 1.

In FIG. 1, the invention is seen in application to a vault enclosure, buried to expose its closure cap 10 substantially at grade level. The enclosure comprises the assembled combination of a relatively large diameter base member A to an intermediate frustoconical member B, which is in turn connected to an upstanding pedestal member C that is removably closed by cap 10.

The base and intermediate members A-B are secured by bolts 11, and the extent to which they are buried is such as to place diametrically opposed cable-entrance ports 12 of member A at the burial depth for each of two multiple-line cables 13-14 to be spliced. Each of the members A-B is suitably of reinforced concrete, with a circular downward axial flange of member B in telescoping fit to a circular counterbore at the upper end of member A. Base member A is an upwardly open cylindrical cup wherein the closed end 15 establishes the floor level for entry of cable at ports 12. These ports are relatively large, and elastomeric grommet means yieldably supports each cable entry, in an orientation close to tangency with the cylindrical inner surface of base member A. This cylindrical inner surface is of diameter at least equal to twice the minimum radius of curl specified for the involved cable. Typically, for a single-mode armored (or not-armored) communication cable containing 4 to 12 optical fibers, the minimum radius of curl is 10 inches, and we find that, for such cable, an inside diameter of 22 inches (for base member A) is well suited to helically coiled storage of both cable-end lengths, for coiled end lengths of as much as 40 feet. To facilitate such storage, the two cables are coiled in the same direction of helical advance, and tape or other lashing (as at 16) of these cable-end lengths into a unit-handling pair of cables is recommended, at intervals of 12 to 18 inches. The vertical height of the coil-storage space within base member A desirably approximates equality to the radius of the cylindrical inner wall, and this height provides ample accommodation of a necessarily requisite seven full turns of cables 13-14, when taped or otherwise lashed together for unitary handling in the process of helical coiling of 40-foot lengths of both cable ends in the base member A.

The intermediate member B is characterized by a frustoconical zone 17 of convergence, from a lower-end cylindrical inner surface which substantially matches the cylindrical inner surface of member A, to an upper-end cylindrical surface which substantially matches the bore diameter of the upper pedestal member C. The slope of the frustoconical inner surface of intermediate member B is at least 25 degrees with respect to a plane normal to the central vertical axis of member B, being preferably in the range 30 to 40 degrees and suitably 33 degrees.

The upper pedestal member C is of internal diameter best suited for removable reception of a splice case 18 of generally cylindrical configuration, with the spliced ends of both cables 13-14 vertically entering the bottom of the splice case. As best seen in FIG. 4, the upper end of pedestal member C is notched at diametrically opposed locations 19, whereby side lugs 20 of the splice case 18 may be seated for suspension of the splice case, without interfering with cap 10 seating upon the otherwise circumferentially continuous upper-end rim of pedestal member C.

Because pedestal member C will probably have to be of various lengths, which will depend on length of the involved splice case, and possibly also on the depth below grade at which cables 13-14 are buried, it is preferred that pedestal member C be a consolidated assembly of plural open-ended cylinders 21 of unit length L. At its lower end, each such cylinder is counterboard to define an axially extending flange which overlaps with telescoping fit to the circumferentially rabbeted upper end of the next-adjacent cylinder 21. These unit-length cylinders are suitably compression-molded products of fiberglass-reinforced thermoset material, and epoxy bonding of the telescoping fit of adjacent cylinders 21 assures a permanently sealed assembly of the pedestal member C. An elastomeric seal, adhesive or caulk is recommended at fit of the lower end of member C to the counterbore at the upper end of intermediate member B; and more of the same sealing material may also be applied to perfect sealed cable entry via the grommets at ports 12. If the rabbeted depth $\Delta$ (FIG. 4) exceeds the notch depth $\Delta'$ at 19, then all unit-length cylinders 21 can be formed with notches 19 without spoiling the circumferentially continuous nature of epoxy-bonding of cylinders 21 in end-to-end adjacency.

In reference now to FIG. 3, the completion of a capped closure of pedestal member C relies on diametrically opposed studs 24 projecting inwardly near the upper end of pedestal member C. A bracket member 25 is suspended by threaded engagement to spaced bolts 26 through the closed end of cap 10, and side-entry slot formations 27-27' in the respective downwardly projecting ends of bracket member 25 are poised for engagement with studs 24, upon partial rotation of cap 10 with respect to pedestal member C. Once thus partially rotated into bayonet-like engagement with studs 24, the bolts 26 may be advanced to draw bracket member 25 upwardly until a clamped closure is achieved. On the other hand, to gain access via such a closure, the bolts 26 may be backed off until release of clamp action, whereupon partial rotation of cap 10 releases bracket member 25 from its bayonet engagement with studs 24, thereby enabling removal of cap 10.

For maintenance, inspection or the like access to the described vault enclosure, once cap 10 has been removed, one need only grasp the splice case to remove it by lifting the same out of the open upper end of pedestal member C. In doing this, the lashed pairing of end lengths of cables 13-14 will smoothly and readily unwind, without kinking, from the upper end of their coiled stacking in base member, care being taken that nothing less than the minimum radius of curl is allowed to develop at exit from the open end of member C, as while transporting the splice case to whatever distance is needed, for example to a parked repair/maintenance vehicle, within the stored-cable range which, in the illustratively described dimensional situation, is almost 40 feet.

Having performed the inspection, testing, repair or other function which dictated splice-case removal, the payed-out cable-end lengths (still lashed at intervals) naturally assume their side-by-side helical development in storage against the cylindrical inner surface of base member, until finally all such cabling has been stored again, and the splice case is returned to position suspended from notch recesses 19. The cap 10 may then be assembled and clamped, as described above.

In the event that cables 13-14 are of armored variety, a grounding connection is desirable and is shown at a ground-lug fitting 29 having removable internal flexible ground-strap connection 30 to the armor sheath of each cable end, near the point of splice-case entry. External grounding-rod connection to lug fitting 29 is conventional and is therefore not shown.

While the invention has been described in detail for a preferred embodiment, it will be understood that modifications may be made without departing from the scope of the invention.

What is claimed is:

1. A buried-cable vault enclosure for receiving end lengths of two multiple-line cables to be spliced and for also receiving a splice case interconnecting the respective corresponding lines of the two cables, said enclosure comprising a relatively large-diameter upwardly open cup-shaped base member having a closed bottom wall and an upstanding cylindrical wall with first and second diametrically opposed cable-entry ports providing cable access substantially at the level of the upper surface of the closed bottom wall, an open-ended intermediate member having a circular lower end conforming and secured to the upper end of the cylindrical wall of said base member, said intermediate member being characterized by a frustoconical wall which converges to a reduced-diameter upper circular end, an upstanding open-ended cylindrical upper wall member conforming to said reduced diameter and fitted at its lower end to the upper end of said intermediate member, said upper wall member being sufficiently elongate and adapted to removably support a portable splice case therewithin, with at least the inner volume of said base member totally available for reception of coiled lengths of both cables associated with the spliced ends of the cables.

2. The vault enclosure of claim 1, in which the inner walls of said base member and of said intermediate member are smoothly continuous with each other at juncture of said base and intermediate members.

3. The vault enclosure of claim 2, in which the mutually secured ends of said base and intermediate members are characterized by telescopically engaged concentric flange formations.

4. The vault enclosure of claim 1, in which said upper wall member comprises a plurality of like open-ended cylindrical-wall components, adjacent cylindrical-wall components having fitted ends which are characterized by telescopically engaged concentric flange formations.

5. The vault enclosure of claim 2, in which at juncture with said base member said intermediate member is cylindrical and of inner diameter matching the inner diameter of said base member.

6. The vault enclosure of claim 2, in which at juncture with said upper wall member said intermediate member is cylindrical and of inner diameter matching the inner diameter of said upper wall member.

7. The vault enclosure of claim 1, wherein the upper end of said upper wall member includes a splice-case suspension formation.

8. The vault enclosure of claim 1, wherein externally accessible grounding-lug means includes an electrically conducting shank locally secured to and through a part of said upper wall member.

9. The vault enclosure of claim 1, in which the inner diameter of said base member is at least twice the minimum radius of curl for the cable size to be accommodated in said enclosure, and in which the slope of tne inner surface of said frustoconical wall is at least 25 degrees with respect to a plane normal to the axis of said frustoconical wall.

10. The vault enclosure of claim 9, in which said slope is in the range of 30 to 40 degrees.

11. The vault enclosure of claim 1, in which said ports are large compared to the diameter of cable to pass therethrough, and means including an elastomeric grommet mounted to each port and configured for yieldable accommodation of a cable for near-tangential entry along the inner cylindrical wall contour of said base member.

12. In combination, a buried-cable vault enclosure receiving the end lengths of two multiple-line cables, and a splice case interconnecting the respective corresponding lines of said two cables, said enclosure comprising a relatively large-diameter upwardly open cup-shaped base member having a closed bottom wall and an upstanding cylindrical wall with first and second diametrically opposed cable-entry ports via which the respective cables enter said base member at substantially the level of the upper surface of the closed bottom wall, an open-ended intermediate member having a circular lower end conforming and secured to the upper end of the cylindrical wall of said base member, said intermediate member being characterized by a frustoconical wall which converges to a reduced-diameter upper circular end, an upstanding cylindrical upper wall member conforming to said reduced diameter and fitted at its lower end to the upper end of said intermediate member, a portable splice removably case suspended within said upper wall member in the space above said base member, whereby at least the inner volume of said base member is totally available for reception of coiled lengths of both cables associated with the spliced ends of the cables.

13. The combination of claim 12, in which the respective cables enter said base member generally tangentially to the inner wall thereof and are coiled therein in the same direction of helical progression.

14. The combination of claim 13, in which said cables are secured to each other at spaced intervals within said enclosure whereby they may be handled and coiled as a substantially unitary pair.

15. The combination of claim 12, in which said splice case is suspended essentially only within said upper wall member, whereby the volume of said intermediate member is available for smooth accommodation of cable-end suspension from said splice case to coiled lengths of said cables.

* * * * *